United States Patent

[11] 3,584,495

[72] Inventor George F. Rausina
Chicago, Ill.

[21] Appl. No. 801,579
[22] Filed Feb. 24, 1969
[45] Patented June 15, 1971
[73] Assignee Motorola, Inc.
Franklin Park, Ill.

[54] TOOL FOR SHEAR FORMING AN ELECTRICAL CONNECTOR IN A WIRE
6 Claims, 9 Drawing Figs.

[52] U.S. Cl. .......... 72/333, 29/626
[51] Int. Cl. .......... B21d 28/00, H05k 3/30, B21d 31/00
[50] Field of Search .......... 72/333, 324, 327, 326, 332, 384; 29/626, 630 D; 83/51, 694

[56] References Cited
UNITED STATES PATENTS

| | | | |
|---|---|---|---|
| 501,851 | 7/1893 | Stupakoff | 72/326 |
| 901,667 | 10/1908 | Wrigley | 72/326 |
| 1,349,169 | 8/1920 | Scheib | 72/324 |
| 3,444,617 | 5/1969 | Stricker | 29/626 |

*Primary Examiner*—Charles W. Lanham
*Assistant Examiner*—R. M. Rogers
*Attorney*—Mueller & Aichele

ABSTRACT: The tool includes a holding mechanism which prevents the deformation of a wire inserted therein along a first cross-sectional axis of the wire, and the tool further includes two shearing blades lying in separate planes which are parallel to the horizontal axis of the wire. These blades are moved into the wire thereby deforming it along its second cross-sectional axis into two bowed portions. The resulting connector is suitable both for making electrical connection to a cylindrical receiving portion, such as the through holes of a printed circuit board, and for holding components and wires in place prior to being flow soldered thereto.

Inventor
GEORGE F. RAUSINA

BY Mueller, Aichele & Rauner
ATTYS.

TOOL FOR SHEAR FORMING AN ELECTRICAL CONNECTOR IN A WIRE

BACKGROUND OF THE INVENTION

Because of the present utilization of miniaturized electronic products, which often include miniature printed circuit boards, there is a need for a tiny, easily made connector which can be used for many purposes including the following: direct, electrical intercoupling of a printed circuit board with another printed circuit board, interfacing a printed circuit board with leads from other portions of an electric system, and holding components on a printed circuit board prior to and during flow soldering. In the past, compression or "banana" plugs, which fit with cylindrical female portions, and expansion or "-spring leaf" receptacles, which fit with cylindrical shafts, have been used for interfacing leads with printed circuit boards. The banana plug has the disadvantages, however, that each male portion requires the assembly of a plurality of parts and the corresponding female portion may take up an undesirable amount of space on a printed circuit board. Although the smaller spring leaf receptacles take up less circuit board space than the smallest banana types, the shaft portion of the smaller spring leaf plugs must be manufactured to a very close tolerance for insuring proper electrical connection.

Prior art mechanisms for providing direct, electrical interfacing between printed circuit boards include a wire-formed male plug which mates with the through holes of a printed circuit board, thereby taking up even less circuit board space than either the banana or spring leaf types. This wire-formed plug is made by welding, at selected points, two lengths of wire having semicircular cross sections. Next the wires are cut into segments whose ends are joined by the weld, and then the segments are compressed to bow the wire into teardrop-shaped male connectors whose ends are flow soldered into the through holes of a printed circuit board.

SUMMARY OF THE INVENTION

It is an object of the present invention to provide an inexpensive compression male plug that can be easily formed in essentially one operation from a wire.

Another object of the invention is to provide an inexpensive, simple method by which portions of a connecting wire or a lead of a component, can be offset or shear formed so that the wire or component will remain in place after installation on a printed circuit board even through the board is subjected to jostling while being transported or flow soldered.

The novel method of manufacture of the male connector of a preferred embodiment of the invention comprises placing a solid wire, of for instance circular cross section, in an enclosure which makes an abutting contact at two diametrically opposite points on the perimeter of the wire to restrict its expansion along a first cross-sectional axis extending between the two points, while allowing the wire to be deformed or offset along a second cross-sectional axis which is perpendicular to the aforementioned first axis. Two shearing blades are placed at diametrically opposed portions with respect to the cross section. Their relative lines of movement are parallel, opposite and along the second cross-sectional axis, which is essentially perpendicular to the longitudinal axis of the wire. The blades of the shears may be circular or oval in shape or they could conceivably have some other shape, and each lies in plane which is parallel to the longitudinal axis of the wire. The shears are moved with respect to each other such that their blades are forced into the wire thereby longitudinally deforming it in opposite directions parallel to the second cross sectional axis. This action may result in separation of the metal of the wire to form two oppositely facing symmetrical bows which lie in planes perpendicular to the cross section of the wire.

DETAILED DESCRIPTION OF THE PREFERRED EMBODIMENT

Figure 2:
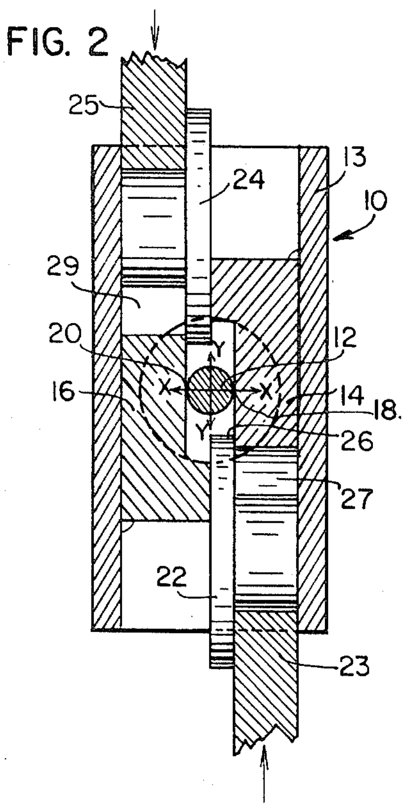
FIG. 2 shows a partially sectionalized end view of the tool shown in FIG. 1 in its load-unload position.
Figure 1:
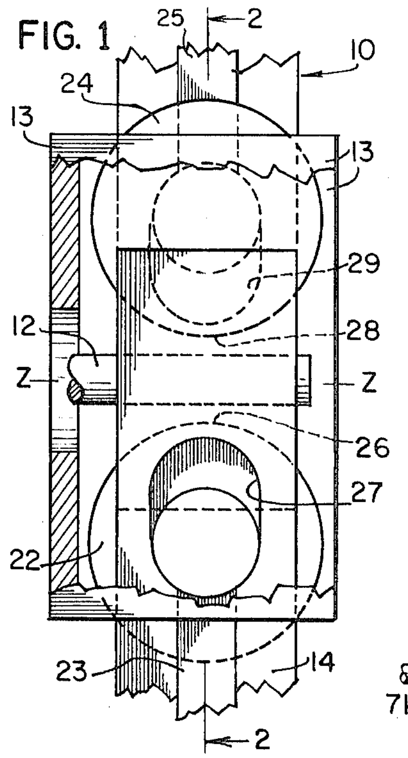
FIG. 1 shows a side view of the tool of a preferred embodiment of the invention in its load-unload position.

In FIGS. 1 and 2 one embodiment of the connector forming tool 10 is shown in its load-unload position wherein wire 12 can be placed in the tool prior to being shear formed and removed from the tool after being shear formed. The frame 13 of tool 10, as can be best seen from FIG. 1, includes holding portions 14 and 16, shown in FIG. 2, which are in a fixed abutting relation to diametrically opposing points 18 and 20 on cross-sectional X–X of wire 12. These holding portions are held in fixed relation to each other by frame 13 and thus confine the wire so that it cannot expand out along cross-sectional axis X–X while it is being shear formed.

Shafts 23 and 25, which slide in slots or tracks in frame 13, are connected to shear-forming blades 22 and 24. The shear forming blades lie in parallel planes which are perpendicular to the plane of the cross section of the wire and, consequently, parallel to the longitudinal axis of the wire. As shown in FIG. 1 shear-forming blades 22 and 24 have curved portions 26 and 28, respectively, which can be moved in opposite directions a fixed distance as determined by respective slots 27 and 29 formed in the holding portions 14 and 16, into the material composing wire 12 along cross-sectional axis Y–Y thereof.

Figure 4:
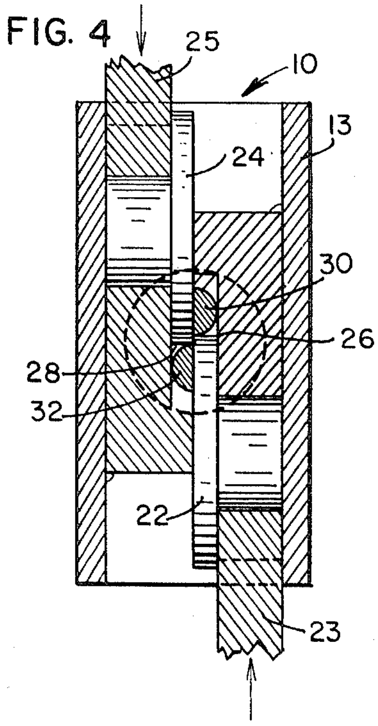
FIG. 4 shows a partially sectionalized end view of the tool of FIG. 3 in its shear-forming position.
Figure 3:
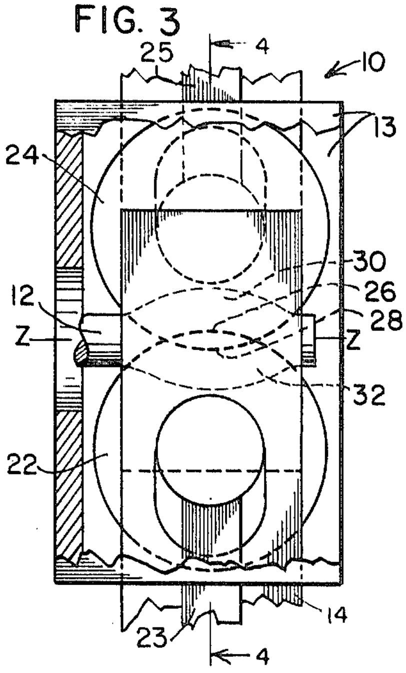
FIG. 3 shows a side view of the tool of FIGS. 1 and 2 in its shear-forming position.

From FIGS. 3 and 4 it can be seen that the curved portion 26 of blade 22 is forced a fixed distance as determined by slot 27 thereby offsetting or shear-forming portion 30 of wire 12 in one direction perpendicular to its longitudinal axis Z–Z and parallel to its cross-sectional axis Y–Y. Curved portion 28 of blade 24 likewise deforms portion 32 of the wire in the opposite direction parallel to its cross-sectional axis Y–Y and perpendicular to its longitudinal axis Z–Z. After the wire has been shear formed, blades 22 and 24 are retracted out of the material of the wire to their load-unload positions as shown in FIG. 1, and the wire may be removed from the shear-forming tool.

Shafts 23 and 25 could be actuated by pneumatic or mechanical means included in an automated tool which could also include, if desired, conventional mechanisms for feeding and for cutting the formed connectors from the wire. Alternatively, the above operations can be performed by a hand-operated tool wherein shafts 23 and 25 are connected to and actuated by pivotally fastened handles which are arranged like those of a pair of common hand pliers. It is also apparent that the shear-formed connectors could be heat-treated, ground, or plated to meet the demands of specialized applications.

Figure 5:
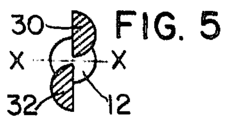
FIG. 5 shows a cross-sectional view of a wire that has been shear formed in the manner of a preferred embodiment of the invention.
Figure 6:
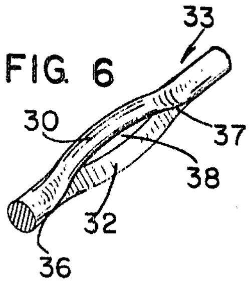
FIG. 6 illustrates perspective view of a wire having an eye that has been shear formed in the manner of a preferred embodiment of the invention.

The shape of offset wire 12 at cross section Y–Y, as shown in FIG. 5, has been changed from a circle to an "S" shape. If the shearing blades are allowed to penetrate deep enough into the material of the wire, there will be a separation of oppositely bowed portions 30 and 32, as shown in FIG. 6, so that they are affixed only at their end points 36 and 37, thus forming eye 38.

Figure 7:
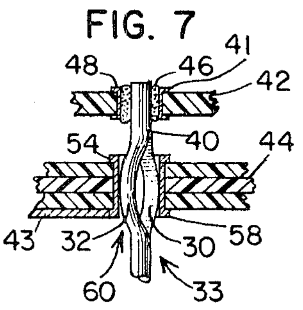
FIG. 7 illustrates the use of a connector having an eye, which was formed in the manner of a preferred embodiment of the invention to provide direct electrical intercoupling between two printed circuit boards.

FIG. 7 shows connector 33 which electrically or conductively interfaces clad portions 41 and 43 of respective printed circuit boards 42 and 44. One end 46 of connector 33 is soldered into the cylindrical through hole 48 of printed circuit board 42. Provided that hole 58 in board 44 has an inside diameter less than the distance between the outsides of bowed portions 30 and 32 but greater than the undeformed diameter of wire 12, the outwardly bowed portions are compression fitted against abutting surfaces 54 and 58 of the through hole as printed circuit board 42 is "plugged" into circuit board 44. For the foregoing application, connector 33 may be shear formed from a material such as steel or spring brass which has a strong natural tendency to retain its shape so that when bowed portions 30 and 32 are compressed toward each other, as in FIG. 7, they will resist this compression by producing a substantial outward force which will hold them in a tight abutting position against the sides of the through hole. As a result, a low-resistance, reliable electrical contact is maintained between clad portions 41 and 43. Connector 33 can also be fastened, by welding for instance, to either solid or stranded wire, or to modules which are to be plugged into some device having receiving receptacles similar to the through holes of a printed circuit board.

Figures 8, 9:
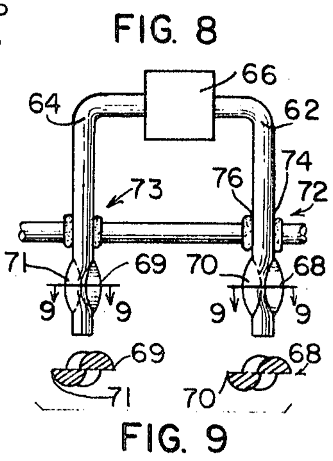
FIG. 8 shows a component whose leads have been shear formed in the manner of a preferred embodiment of the invention into connectors which are suitable for holding the component in place on a printed circuit board.
FIG. 9 shows an enlarged cross-sectional view of the connectors of FIG. 8.

Another use contemplated by the invention is shown in FIG. 8 where the leads 62 and 64 of components 66—which might be a resistor, capacitor or inductor—have been respectively shear formed into outwardly bowed portions 68, 70 and 69, 71. In forming these bowed portions, the blades of the shear-forming tool were not allowed to penetrate deep enough into the material of the wire to cause an eye to be formed therein. Cross sections of these leads are shown in FIG. 9. The bowed portions have been forced through printed circuit board though holes 72 and 73. While lead 62, for instance, is being pressed into through hole 72, bowed portions 68 and 70 are compressed in toward each other by abutting surfaces 74 and 76. After being pressed on through the hole bowed portions 68 and 70 expand or snap out to their offset form. It is necessary to apply a force to leads 62 and 64 in order to withdraw them through their respective through holes because it is necessary to recollapse bowed portions 68, 70 and 69, 71. Therefore, leads that have been shear formed in the manner of the invention and installed on a printed circuit board are held in place while the printed circuit board is being transported and flow soldered.

What has been described, therefore, is a method and tool for making a small compression male plug in essentially one operation from a wire. Although the shear forming blades of the tool have been described as being circular in shape, it is within the scope of the invention for them to have some other shape. After the connector has been formed it can be cut from the wire, ground, heat-treated or plated, and installed on printed circuit boards, modules, or wires so that they can be plugged into the receptacles of a receiving device to make a reliable electrical connection therebetween. Another use for the invention is to provide an offset in component leads or in wires which are to be installed on printed circuit boards or the like, so that the components or wires will remain in place prior to and during flow solder.

I claim:

1. Apparatus for forming a wire into a connector suitable for mating with an aperture, the connector being comprised of first and second portions which are bowed in opposite directions and which are affixed to each other at each end thereof, such apparatus including in combination:

holding means adapted to be positioned in an abutting relationship to the circumference of a wire for preventing extension of the wire along a first axis of the cross section thereof;

first shearing means having a first curved portion on the periphery thereof for engaging the wire; second shearing means having a second curved portion on the periphery thereof for engaging the wire; said first and second curved portions being diametrically located with respect to each other on opposite sides and intermediate the ends of said wire;

first driving means connected to said first shearing means;

means guiding the motion of said first driving means so that said first and second shearing means are relatively movable toward each other only in substantially opposite directions along a second axis of the cross section of the wire which is perpendicular to said first axis; said first driving means moving said first shearing means relative to said second shearing means along said second axis into the wire so that said first and second curved portions offset the shape of the wire intermediate the ends and along said second cross-sectional axis of the wire to form the bowed portions of the connector.

2. The apparatus of claim 1, wherein said means guiding the motion of said first driving means is a first track means.

3. The apparatus of claim 2, further including:

second driving means connected to said second shearing means, second track means guiding the motion of said second driving means so that said first and second shearing means are relatively movable toward each other relative to said holding means along a rectilinear path.

4. The apparatus of claim 1, wherein said first and second curved portions of said first and second shearing means lie in planes parallel to the plane of the longitudinal axis of the wire, said first and second shearing means being movable a predetermined distance with respect to each other into the wire from opposite direction along said second cross-sectional axis by said first driving means.

5. The apparatus of claim 4, wherein said first and second curved portions are moved a predetermined distance, which is greater than the radius of the wire into the wire to form the first and second connector portions, and thereby offsetting the shape thereof to cause the first and second connector portions to separate at a first point along the longitudinal axis of the wire and enabling the first and second connector portions to remain affixed at second and third points along the longitudinal axis of wire which are located on each side of said first point.

6. The The apparatus of claim 1, wherein said first and second curved portions are moved a predetermined distance into the wire which is less than the radius of the wire thereby offsetting the shape thereof to form the first and second connector portions without causing the first and second connector portions to separate.